United States Patent [19]

Penson

[11] Patent Number: 5,351,976
[45] Date of Patent: Oct. 4, 1994

[54] EQUIPMENT CART

[76] Inventor: Joe R. Penson, 4918 TVA Lab Rd., Louisville, Tenn. 37777

[21] Appl. No.: 27,685

[22] Filed: Mar. 8, 1993

[51] Int. Cl.⁵ .............................. B62B 3/10; B62B 3/12
[52] U.S. Cl. .................................. 280/47.35; 280/62; 280/79.3
[58] Field of Search .................... 280/47.34, 47.35, 62, 280/79.2, 79.3

[56] References Cited

U.S. PATENT DOCUMENTS

| D. 189,814 | 2/1961 | Smith | 280/47.35 X |
| 912,035 | 2/1909 | Schaefle | 280/79.3 X |
| 1,629,941 | 5/1927 | Wipperman | 280/47.35 X |
| 3,722,700 | 3/1973 | Cummings | 280/79.3 X |
| 4,391,454 | 7/1983 | Marsh et al. | 280/47.35 |
| 5,083,805 | 1/1992 | Monch et al. | 280/47.35 |

FOREIGN PATENT DOCUMENTS

| 129435 | 10/1948 | Australia | 280/62 |
| 1505842 | 7/1969 | Fed. Rep. of Germany | 280/47.35 |
| 681242 | 5/1930 | France | 280/62 |
| 1253648 | 12/1962 | France | 280/62 |
| 674662 | 6/1952 | United Kingdom | 280/62 |

Primary Examiner—Brian L. Johnson

[57] ABSTRACT

A three-wheeled sports equipment cart has a plurality of horizontal support surfaces mounted in tiers, Compartments mounted on or recessed in the frame are of a size and shape suitable to hold standard items of equipment for sports events.

7 Claims, 5 Drawing Sheets

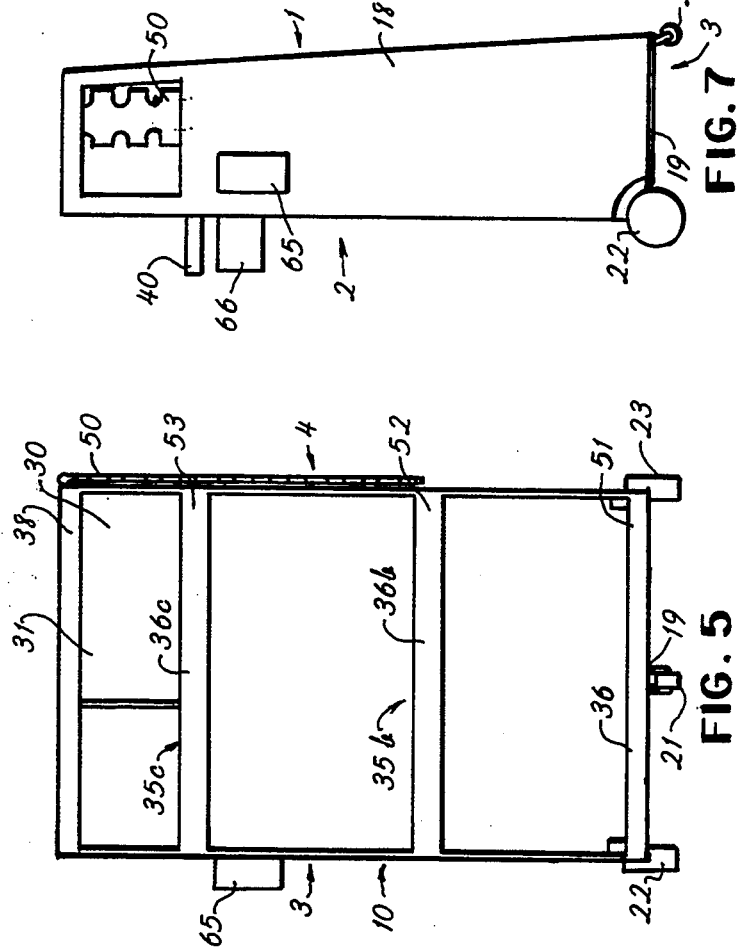

EQUIPMENT CART

BACKGROUND OF THE INVENTION

Organized sports activities require ready access to multiple items of equipment. In addition, it is good practice to provide players with access to water or other refreshments and perhaps ice for the treatment of minor injuries. First aid equipment also needs to be readily available on the field. Transporting numerous items of equipment to and from the field is awkward for one person and may require either multiple trips or several persons to carry the equipment and supplies.

For a football game, for example, the equipment provided would typically include one or more footballs, a box of first aid equipment, a water cooler, cups, water bottles, and the protective gear worn by players. It may also be desirable to have available an ice chest to provide ice both for refreshment and for the treatment of minor injuries. An even more extensive set of equipment may be made available to better supplied teams. For example, college or university teams typically have more items of gear than high school or junior high school teams. In some cases, it may also be customary to bring other items of medical equipment, such as crutches or cervical collars, onto the field.

For baseball, players typically need balls and bats, which may be awkward to carry. Since baseball is typically a summer game, prudent coaches generally also assure that ice and water or other refreshments are available for players. All of these pieces of equipment and materials must be brought out to the playing field before a game or practice session and then returned from the field at the conclusion of the event. For competition among schools, the items must be transported not only from a nearby locker room or storage area but possibly between schools as well. Such transportation involves multiple steps of packing, loading, and carrying the various items of gear.

Although traditional carts may be used to transport sports equipment, use of a traditional cart has certain disadvantages. A traditional cart may or may not be stable on the relatively uneven surface (as compared with, for example, a sidewalk or street) of a playing field. In addition, items of equipment placed on an ordinary cart may have a tendency to roll off, particularly as the cart moves across minor irregularities in the ground. It is therefore desirable to have a cart particularly adapted to carry the right amount of equipment and the particular items which would be used in a football game, baseball game, basketball game, or the like.

SUMMARY OF THE INVENTION

This invention relates to carts and more particularly to carts especially designed to carry sports equipment. One object of this invention is to provide a cart with compartments and shelves suitable for carrying the array of equipment and supplies used in particular sports activities, more specifically in football, basketball, and baseball, onto the playing field. Another object of this invention is to provide an attractive, lightweight and stable cart which can easily be handled by one person. A still further object of this invention is to provide a cart which can be used to store equipment when the equipment is not in use.

The cart that is the subject of this application comprises a frame, wheels attached to the frame, and a plurality of holding members. Viewed from above, the cart is rectangular in outline, and description is made in reference to the sides of this rectangle. A first wheel is centrally located along a first side of the cart, and two larger wheels are located on adjacent sides of the cart near a second side opposite the first side. Shelves and compartments suitable for holding particular items of sports equipment are connected to or integral with the frame in a tiered arrangement.

In a first principal embodiment, shown in FIGS. 1 through 4, the uppermost tier extends beyond lower tiers at a second side of the cart, and the frame comprises a frame base, a first vertical support member centrally located along the first side of the cart, an upper frame member, and a plurality of vertical support members. An intermediate frame member may also be provided in some embodiments. The first vertical support member connects the tiers of the frame and is useful in guiding and pushing or pulling the device, and second and third vertical support members connect upper tiers to the frame base at or near the point where the second and third wheels attach to the frame base.

In a second principal embodiment, shown in FIGS. 5 through 9, all tiers are aligned along three sides of the cart, and along the second side of the cart, each tier is recessed slightly relative to the tier below. A single vertical support member encloses the cart on three adjacent sides, including the first side.

All embodiments of the cart include a compartment for balls and minor medical supplies, support surfaces for a drink cooler or ice chest, and storage space for other supplies, gear or equipment. The cart is preferably constructed of a lightweight and durable material such as steel for ease of handling and resistance to wear and tear, but aluminum or any other suitable material can be readily substituted.

FIGS. 1, 2, 3, and 4 illustrate a cart that is particularly useful in storing and moving football equipment. For simplicity of description, this embodiment of the invention will be referred to as a "football cart". Likewise, FIGS. 5, 6, 7, 8, and 9 illustrate a second principle embodiment, adaptations of which are referred to for simplicity of understanding as a "basketball cart" or "baseball cart". It will be seen that each of the embodiments described may be useful in other applications, and references to particular applications and the use of sub-headings are intended only as an aid to organization and clarity and are not intended as limitations on this invention.

BRIEF DESCRIPTION OF THE DRAWINGS

FIG. 5 is a front view of a second embodiment of the invention.

FIG. 6 is a plan view of a second embodiment of the invention.

FIG. 7 is a side view of a second embodiment of the invention.

FIG. 8 is a side view of a second embodiment of the invention.

FIG. 9 is a plan view of an alternative embodiment of the invention.

DESCRIPTION OF THE INVENTION

Figure 4:
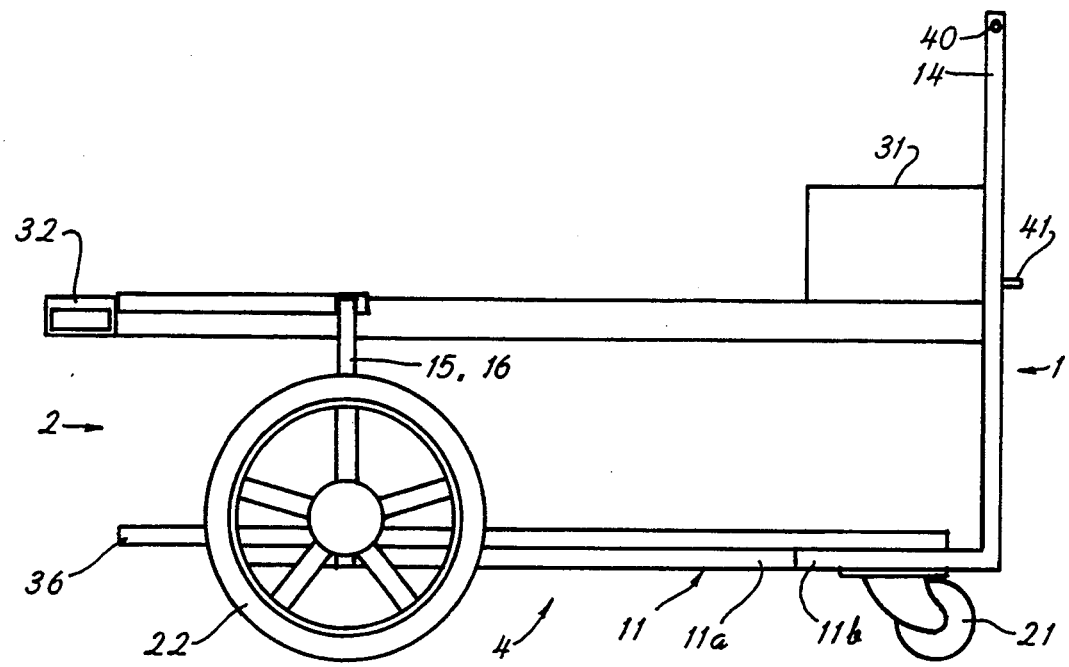
FIG. 4 is a lateral view of a first embodiment with one wheel removed.

The cart that is the subject of this application comprises a multi-tiered frame, shown generally at 10, wheels 21,22,23 rotatably attached to the frame 10, one or more horizontal support surfaces attached to the frame 10, a first aid compartment 30 suitable for holding a variety of minor medical items, and a ball compartment 31 of size and dimensions suitable for holding one or more balls.

Viewed from above, the outline of the cart forms a rectangle, and the cart is described with regard to the sides of this rectangle. First, second, third and fourth sides of the cart are indicated in the figures as, respectively, 1, 2, 3 and 4. One or more vertical support members connect the tiers of the frame. The frame base 11 may be of any convenient configuration, but an I-beam provides adequate stability for a small cart without adding unnecessary weight. The upper and intermediate frame tier members 12, 13 each form a rectangular base. A handle 40 may also be provided. A first wheel 21 is centrally located at the midpoint of the first end 1 of the cart, and two larger wheels 22, 23 are located on either side 3, 4 of the cart near the second end 2. The wheels 21, 22, 23 are rotatably attached to the frame 10 using conventional means.

The invention may be understood in terms of its three basic applications, i.e., for football equipment, basketball equipment, and baseball equipment. Within each general sports area, further embodiments may be seen to provide different advantages in different situations.

Football Cart

Figure 1:
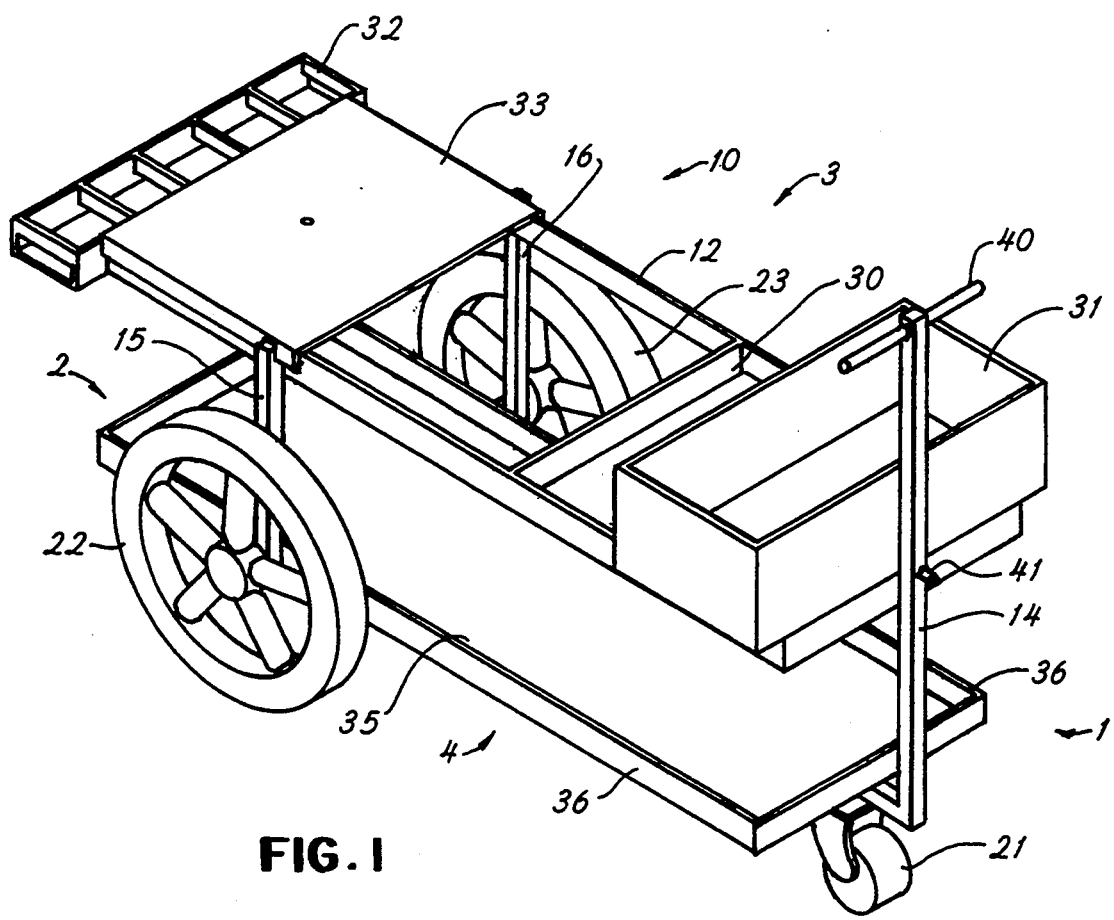
FIG. 1 is a perspective view of a first embodiment of the invention.
Figure 2:
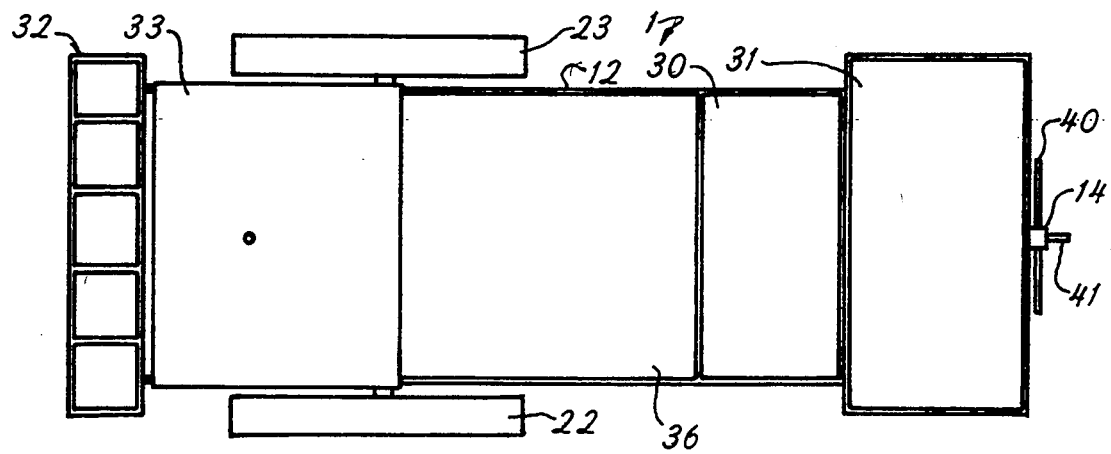
FIG. 2 is a plan view of a first embodiment of the invention.
Figure 3:
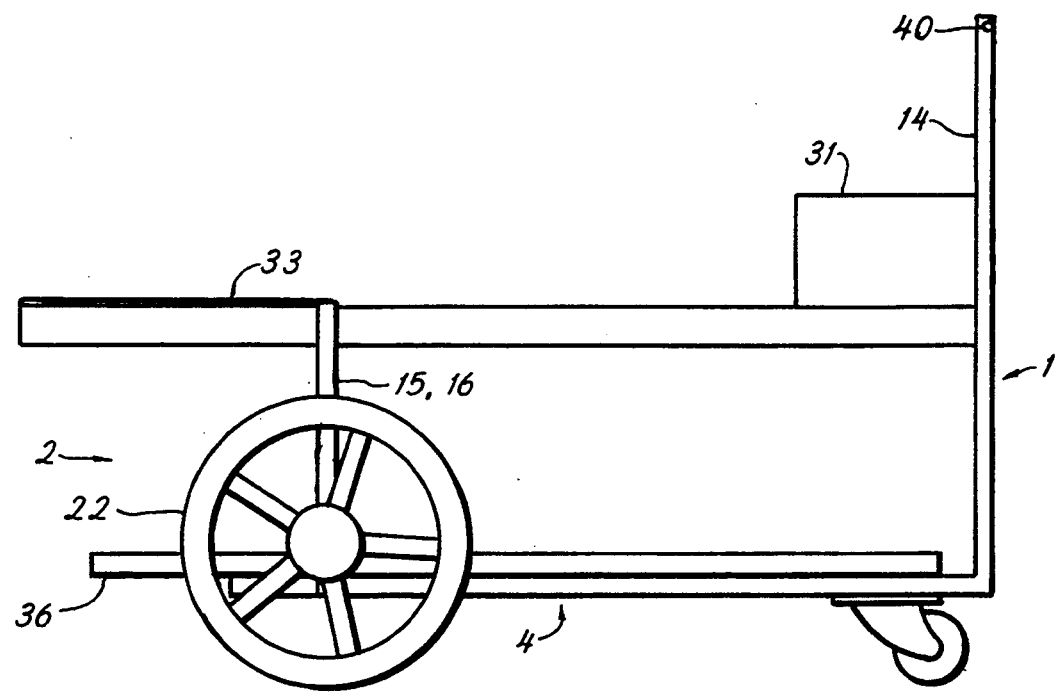
FIG. 3 is a lateral view of a first embodiment of the invention.
Figure 11:
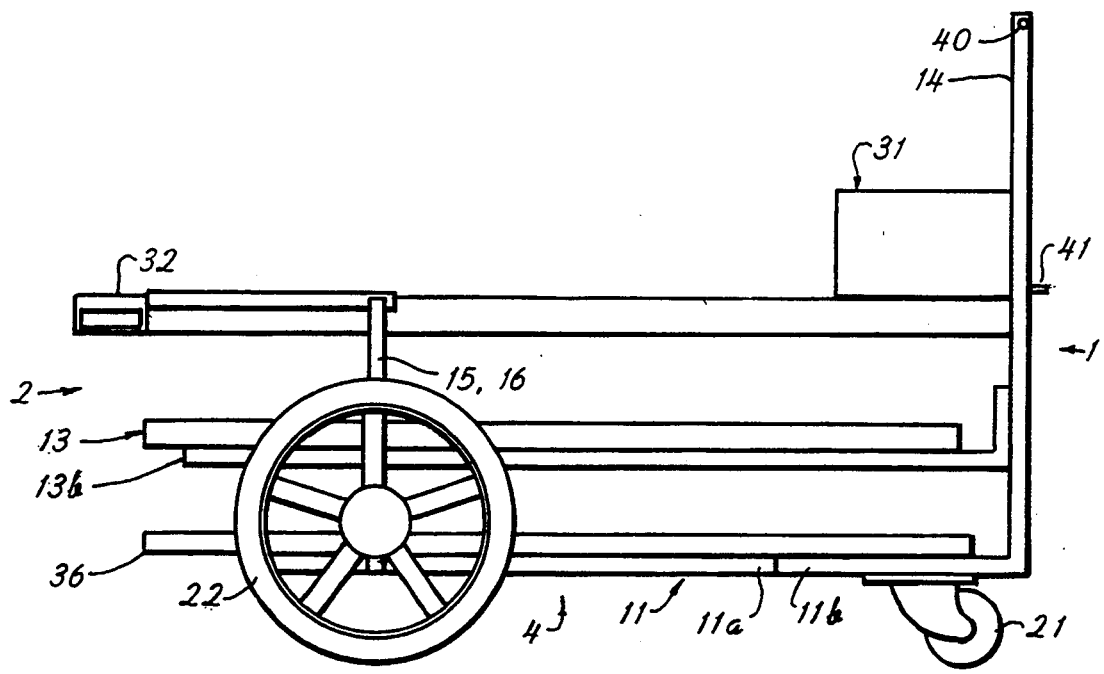
FIG. 11 is a lateral view of a third embodiment of the invention.
Figure 10:
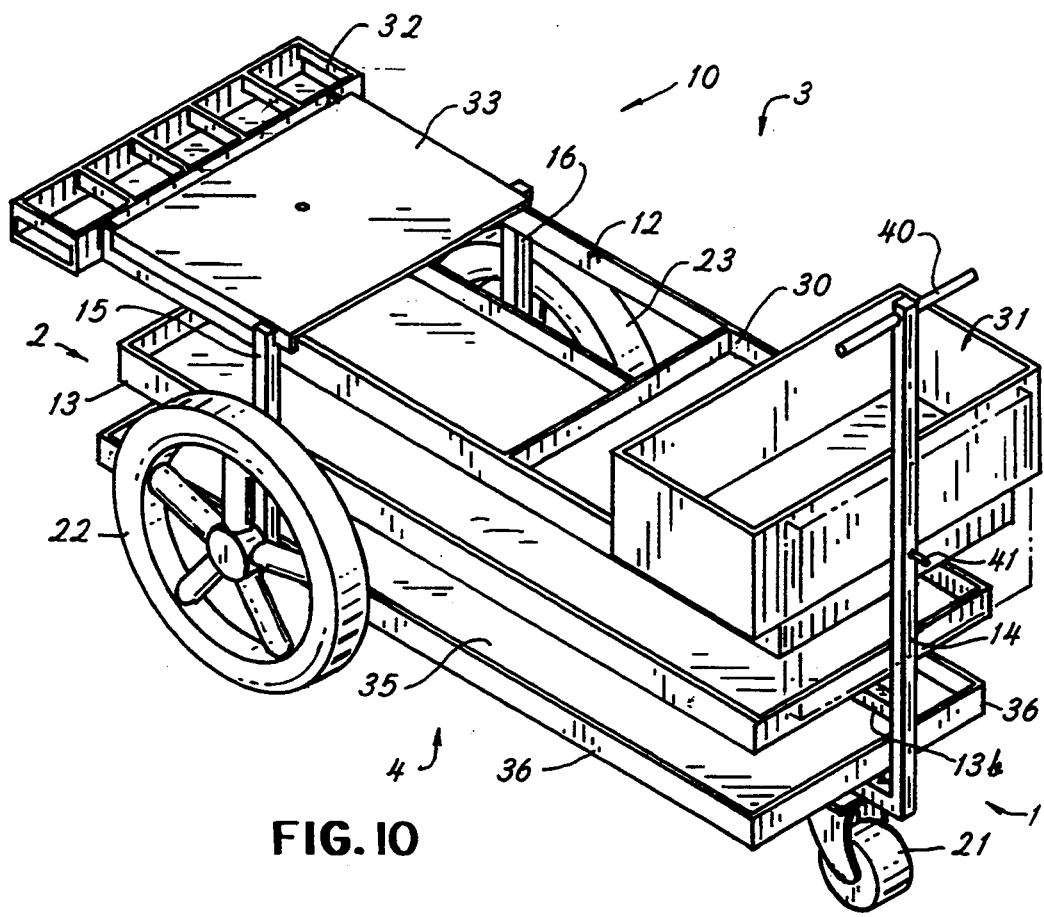
FIG. 10 is a perspective view of a third embodiment of the invention.
Figures 12, 13:
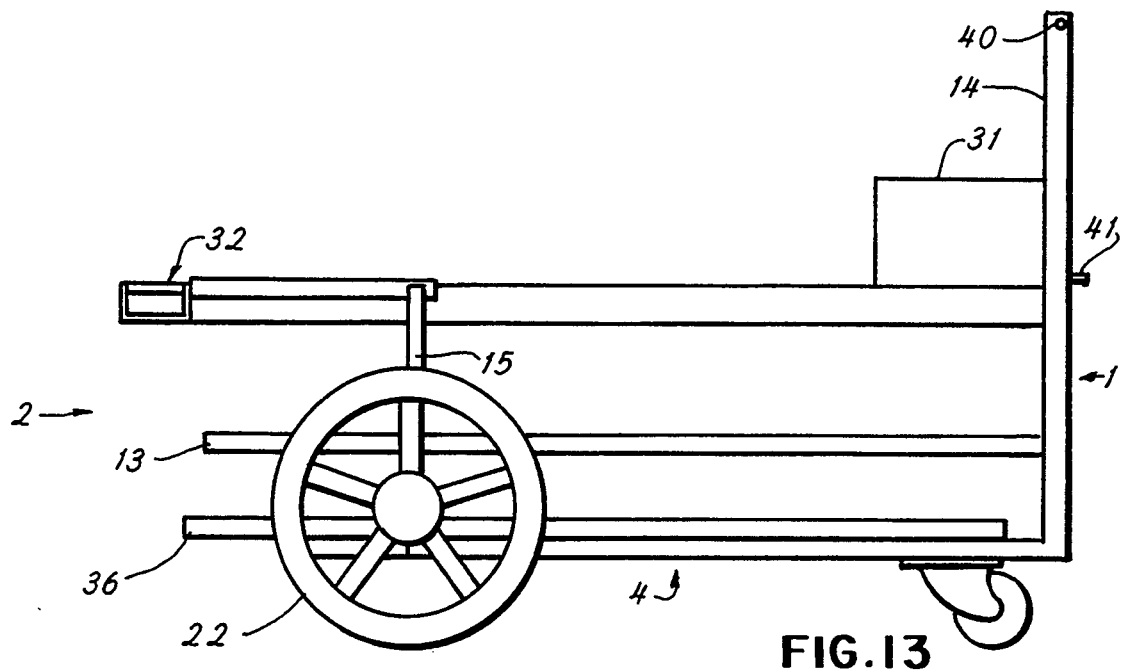
FIG. 12 is a perspective view of a fourth embodiment of the invention.
FIG. 13 is a lateral view of a fourth embodiment of the invention.

Referring more particularly to the Figures, FIG. 1 is a perspective view of the football cart. FIG. 2 is a plan view of the football cart, and FIG. 3 is a lateral view of the football cart. A frame 10 comprises a frame base 11, upper frame tier member 12, and vertical support members 14, 15, and 16. The frame base 11 supports and is attached to a tray 35 surrounded by a narrow rim 36. The frame base 11 may be made as an integral piece as shown in FIG. 3 or it may be made as separate pieces 11a and 11b and joined as shown in FIG. 1. This latter construction may be preferable if the cart is to be shipped for assembly at another site. Upper frame tier member 12 is a rectangular band which supports other portions of the cart and provides a retaining means for a large water cooler or the like.

A third frame tier member 13 may also be provided. The third frame tier member 13, if provided, is a tray identical to tray 35 located in a plane parallel to the frame base 11 and preferably located six to twelve inches above the frame base 11. A first wheel 21 is located rotatably on an axis, and the wheel and axis assembly are mounted in a conventional manner to the frame base 11. Second and third wheels 22, 23 are symmetrically mounted on third and fourth sides of the frame base 11 near the second side 2 of the frame base 11. Second and third wheels 22, 23 preferably turn about a common axle, and this wheel assembly (comprising second and third wheels 22, 23, axle, and mounting means) is mounted on the frame base 11 in a conventional manner. A first vertical support member 14 centrally located at a first end of the rectangle connects multiple tiers 11, 12, 13, of the frame and is useful in guiding and pushing or pulling the device. Upper frame tiers 12, 13, are also connected to the frame base 11 at a second side 2 of the cart by second and third vertical support member 15, 16. Second and third support members 15, 16 are preferably attached to the tray 35 on either side 3,4 of the cart near a second side 2, at the point where the wheel assembly projects beyond the tray 35.

FIG. 4 is a lateral view of the football cart with the wheel 22 removed to show where vertical support member 15 attaches to the tray 35.

In a first embodiment, shown in FIG. 1, the upper frame tier member 12 includes an open rack 32 with partitions suitable for holding bottles and cups. The rack 32 may be made integrally with the uppermost frame tier member 12 or may be made as a separate piece and attached to the upper frame tier member 12. A removable tray 33 is also provided. An attachment means 41 such as a hook or stud is provided at the first end of the vertical support member to suspend or attach the tray 33 in a stable position when the tray 33 is not in use. In use, tray 33 fits across upper frame tier 12 intermediate rack 32 and the point at which the second and third vertical support members 15, 16 attach to upper frame tier member 12. Downturned edges on the removable tray 33 fit the tray 33 snugly to upper frame tier 12 to provide additional stability. This removable tray 33 provides a useful surface upon which to set a water cooler for use by team members. FIGS. 1, 2 and 4 show the tray 33 in use.

In an alternative embodiment, the football cart does not have a rack 32 or a removable tray 33 but has instead a larger fixed support surface 34 suitable for supporting an ice chest. The fixed support surface 34 extends from the medicine compartment to the end of the tier. FIG. 3 shows the cart with fixed support surface 34 on upper frame tier member 12. In this alternative embodiment, a third frame tier 13 (not shown) suitable for holding a cooler is connected to the vertical support members 14, 15, 16 at a point intermediate and parallel to the frame base 11 and upper frame tier member 12.

While the football cart can be made of any convenient size, it is preferable that its dimensions be small enough to fit in the cargo compartment of a bus for travel and large enough to accommodate such items as a water cooler, footballs, and ice chest. An overall length (from side 1 to side 2) of about 54 inches, width (from side 3 to side 4) of about 20 inches, and height (from floor to handle) of about 29 inches, provide a cart which can accommodate most equipment and remains relatively easy to handle. The rim 36 ideally extends about one inch above the tray 35, and the upper frame tier 12 ideally forms a band about two inches tall surrounding the upper tier of the cart. With these dimensions, a first aid compartment 30 about 16 inches wide and about eight inches (along the axis from side 1 to side 2) can fit between the sides 3, 4 of the upper frame tier 12 and flush with both upper and lower edges of the upper frame tier 12, and provides adequate space for minor first aid supplies.

Ball compartment 31 is preferably about six inches in height and about ten inches long (from side 1 to side 2), and about 20 inches wide (side 3 to side 4). Ball compartment 31 is supported by sides 3, 4, upper frame tier 12 and the first vertical support member 14. In the embodiment that includes an intermediate frame tier member 13, the intermediate frame tier member 13 may be located about eight inches above the frame base 11. This relationship allows storage space on the tray 33 for less frequently used items, such as crutches, and still allows space to place a small ice chest on the third frame tier member 13.

Basketball/Baseball Cart

Other embodiments of the invention are adapted for use with basketball or baseball equipment. In these embodiments, shown in FIGS. 5 through 9, the multi-tiered frame preferably comprises three levels, 51, 52, 53. For convenience, the lowest of these levels is referred to as the first level 51, and the highest of these levels is referred to as the third level 53. The frame 10 comprises frame panel 18 and base member 19. The frame panel 18 has a u-shaped cross-section and may be constructed by bending a strip or panel of suitable material, such as sheet metal, in two right angles such that facing sides of the "u" are parallel and of the same dimensions. For purposes of description, the sides 3, 4 of the cart enclosed by the facing sides of the "u" are referred to as "ends" of the cart. A tray 35 with a narrow rim 36 is fixed across one end of the frame panel 18, to become the "bottom" of the cart, and base member 19 is attached to frame panel 18 beneath tray 35 to provide additional support. Base member 19 is preferably located between the midpoints of sides 1 and 2. Small wheel 21 is rotatably attached to base member 19, and wheel assembly is arranged as described for the football cart. In this embodiment, however, each tier is slightly narrower in the dimension from side 1 to side 2 than the tier beneath it. Viewed from either side 3 or 4, the cart presents a trapezoidal face with two right angles at the edge adjoining side 2. These trapezoidal ends 3, 4 and the "back" side 3 are enclosed by a solid sheet of a suitable material.

A second horizontal support surface 35b with a narrow rim 36b is attached to the frame 10 at the second level 52, and the second level 52 is preferably located at a height relative to the first level so that a standard-sized ice chest can easily slide between the second and third levels. A third horizontal support surface 35c with a narrow rim 36c is attached to the frame 10 at the third level 53. A narrow band 38 connects sides 3 and 4 of the frame panel 18 at the top of the cart. In the embodiment most useful for basketball, shown in FIGS. 5 and 6, a panel 61 connects band 38 to frame panel 18, providing a ball compartment 31 and section 63 suitable for holding a water cooler. In an embodiment suitable for use with baseball equipment, shown in FIGS. 8 and 9, the space shown as ball compartment 31 in FIG. 5 is further divided to allow space both for a ball compartment 31 and for a first aid compartment 30, and a bat rack 50 is attached to frame panel 18 by an attachment means and may be secured in a horizontal position by a securement means. One suitable attachment means is a hinge, and a suitable securement means may be as simple as a pin inserted through holes in the rack with holes in the lateral surface and fixing them in place.

In embodiments useful for basketball or baseball, a first holding means for holding cups 65 and a second holding means for holding a trash bag 66 are preferably attached to frame panel 18 on any desired vertical surface, as illustrated in the drawings. A handle 40 preferably attached to frame panel 18 along side 2, may be used to guide the cart. While the cart can be made in any desired size, convenient dimensions are as follows:

| | |
|---|---|
| Height | 38 inches |
| Width (side 3 to side 4) | 30 inches |
| Length (side 1 to side 2) at base | 16 inches |
| Length (side 1 to side 2) at top | 13 inches |

I claim:
1. A sports equipment cart comprising
a frame base
a rectangular first horizontal support surface attached to the frame base, said first horizontal support surface terminating in a narrow vertical rim
first, second, third and fourth sides of the cart corresponding to the sides of the rectangular frame base, said first and third sides being parallel to each other and said second and fourth sides being parallel to each other,
a first vertical support member connected to the frame base and extending upwardly from the rectangular first horizontal support surface along the first side of the cart at a point equidistant from the second and fourth sides of the cart,
second and third vertical support members each symmetrically located at a point near the third side of the cart and connected to second and fourth sides of the first horizontal support surface,
a rectangular upper frame tier member attached to the first vertical support member at a point along the first side of the cart at a point equidistant from the second and fourth sides of the cart and attached along the second and fourth sides of the cart to the second and third vertical support members, said upper frame tier member comprising a rectangular band with an open interior suitable for admitting items taller than the distance between the upper frame tier member and the first horizontal support surface while said items are supported on said cart from below said upper frame tier member,
a first wheel and axle mounted to the frame base at a point near the first side of the cart and equidistant from the second and fourth sides of the cart,
a second axle mounted to the frame base adjacent to the points where the second and third vertical support members attach to the first horizontal support surface,
second and third wheels rotatably mounted on the second axle,
a first box-shaped compartment mounted on the upper frame tier adjacent to the first vertical support member and extending across said upper frame tier member along the second and fourth sides of the cart, said first box-shaped compartment being of a size and shape suitable for receiving footballs, and a second box-shaped compartment mounted within the upper frame tier member adjacent said first box-shaped compartment.

2. The sports equipment cart as described in claim 1 wherein said upper frame tier member is provided with a rack for supporting containers.

3. The sports equipment cart as described in claim 2 wherein a removable tray is provided, said tray being adapted to fit across the second and fourth sides of the upper frame tier such that approximately one-fourth to one-half of the area enclosed by the rectangular upper frame tier member remains uncovered to permit placement from above of items on the first horizontal support surface.

4. The sports equipment cart as described in claim 3 wherein an attachment means is provided on the first vertical support means and a removable tray is provided with means to accept said attachment means.

5. The sports equipment cart as described in claim 4 wherein said mounting means is a stud and said means to accept said mounting means is a hole.

6. The sports equipment cart as described in claim 1 wherein a rectangular third frame member is attached to the first, second, and third vertical support members at a point intermediate the frame base and upper tier frame member and a horizontal support surface is attached to and co-extensive with said third frame member.

7. The sports equipment cart as described in claim 6 wherein a horizontal support surface is mounted upon the upper tier frame member between the second box-shaped compartment and the third side of the cart, said horizontal support surface terminating with a narrow vertical rim.

* * * * *